US008496526B2

(12) United States Patent  (10) Patent No.: US 8,496,526 B2
Mori  (45) Date of Patent: *Jul. 30, 2013

(54) GAME MACHINE, CONTROL METHOD OF GAME MACHINE AND INFORMATION STORAGE MEDIUM

(75) Inventor: Shoji Mori, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/613,815

(22) Filed: Sep. 13, 2012

(65) Prior Publication Data

US 2013/0005416 A1  Jan. 3, 2013

Related U.S. Application Data

(62) Division of application No. 12/159,350, filed as application No. PCT/JP2006/320272 on Oct. 11, 2006, now Pat. No. 8,287,369.

(30) Foreign Application Priority Data

Dec. 27, 2005  (JP) ................................. 2005-375992

(51) Int. Cl.
*A63F 13/00* (2006.01)
*A63F 9/24* (2006.01)
*G06F 17/00* (2006.01)

(52) U.S. Cl.
USPC .............................................. 463/31; 463/36

(58) Field of Classification Search
USPC ...................................................... 463/31, 36
See application file for complete search history.

(56) References Cited

U.S. PATENT DOCUMENTS 5,863,248 A  1/1999  Mine et al.
6,280,323 B1  8/2001  Yamazaki et al.
(Continued)

FOREIGN PATENT DOCUMENTS

EP  1155718 A2  11/2001
EP  1184059 A1  6/2002
(Continued)

OTHER PUBLICATIONS

World Soccer Jikkyo Winning Eleven 3 Final Version, Dengeki Playstation, vol. 4, No. 30, Media Works Inc., Dec. 25, 1998, p. 72-73.

(Continued)

*Primary Examiner* — David L Lewis
*Assistant Examiner* — Shauna-Kay Hall
(74) *Attorney, Agent, or Firm* — Sughrue Mion, PLLC

(57) ABSTRACT

A game machine on which a user allows a plurality of player characters of an operation subject team to perform linkage play. A linkage partner selecting unit selects a linkage partner player character from among fellow player characters. A type of linkage play selecting unit selects a type of linkage play. A linkage partner control unit controls the position of a linkage partner player character based on a selected type of linkage play. If a linkage partner player character is not selected, a pass execution unit makes an operation subject player character execute a pass in a direction based on the content of a pass instruction operation according to the pass instruction by the user. If a linkage partner player character is selected, the pass execution unit makes the operation subject player character execute a pass to a linkage partner player character based on the user's pass instruction operation.

15 Claims, 13 Drawing Sheets

U.S. PATENT DOCUMENTS

| | | |
|---|---|---|
| 6,676,518 B1 | 1/2004 | Sawa et al. |
| 7,399,224 B2 | 7/2008 | Hirai |
| 7,708,641 B2 | 5/2010 | Tawara |
| 2001/0044334 A1 | 11/2001 | Kuri |
| 2004/0209680 A1* | 10/2004 | Oyamada et al. ............... 463/31 |
| 2005/0003877 A1 | 1/2005 | Cummings |
| 2005/0159197 A1 | 7/2005 | Tawara |
| 2005/0176502 A1 | 8/2005 | Nishimura et al. |
| 2007/0004481 A1 | 1/2007 | Riccio et al. |

FOREIGN PATENT DOCUMENTS

| | | |
|---|---|---|
| JP | 07178246 A | 7/1995 |
| JP | 2002-260015 A | 9/2002 |
| JP | 2002-346221 A | 12/2002 |
| JP | 2005-245784 A | 9/2005 |
| TW | 527201 A | 4/2003 |
| TW | 1233830 A | 6/2005 |

OTHER PUBLICATIONS

FIFA Total Football, Dengeki Playstation, vol. 10 No. 9, Media Works Inc., Mar. 26, 2004, p. 138 to 139.

LiberoGrande Konin Guide Book, first edition, Shogakukan Inc., Jan. 1, 1999, p. 7.

FIFA Total Football, [online], Electronic Arts Inc., 2004, [retrieval date Dec. 18, 2006], <http://www.japan.ea.com/totalfootball/>.

FIFA Soccer 2004, [online], Electronic Arts Inc., 2005, [retrieval date Dec. 18, 2006], Internet <http://www.easports.com/games/fifa-2004/>.

"Jikkyo World Soccer 2001, Perfect Guide," first edition, Konami Corporation, Dec. 15, 2001, p. 25.

"Super Formation Soccer 2, Hissatsukouryakuhou," Futabasha Publishers Ltd., Jul. 10, 1993, p. 58.

Taiwan Search Report corresponding to Taiwan Patent Application No. 09514089, dated Aug. 28, 2009.

European Search Report corresponding to European Patent Application No. 06811579.9, dated Feb. 26, 2010.

http://www.gamespot.com/ps2/sports/fifa2004/review.html?tag=tabs%3Breviews by Justin Calvert, GAme Sport Posted Nove. 21, 2003 5:44pm PST.

\* cited by examiner

FIG.2
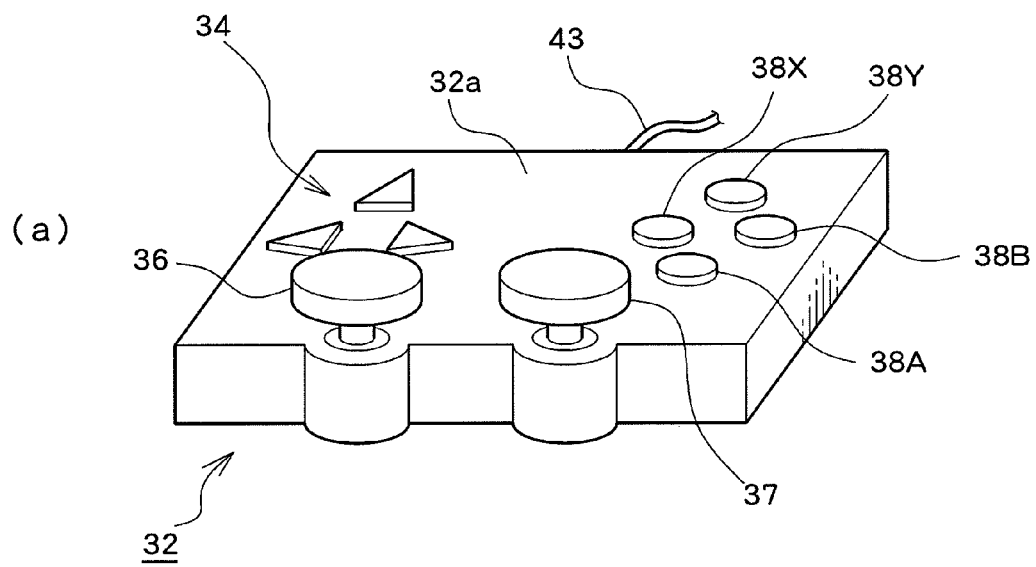
(a)
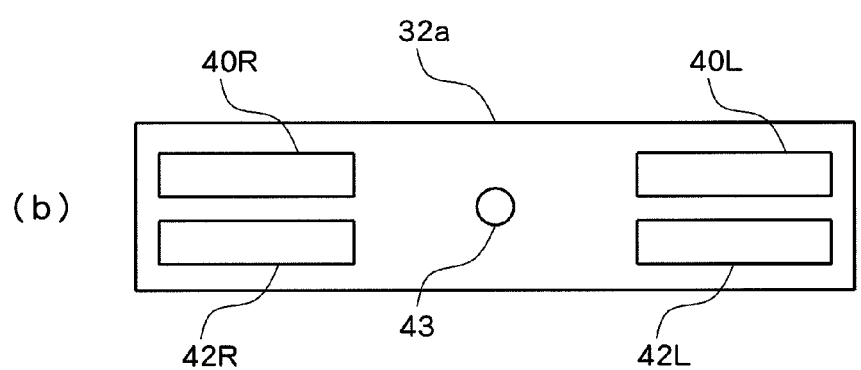
(b)

FIG.7
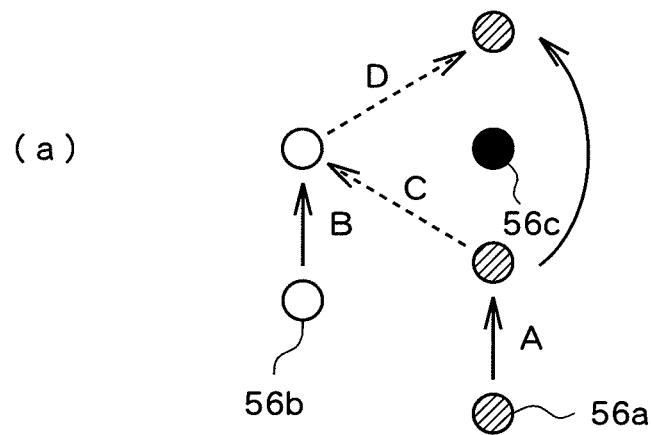
(a)
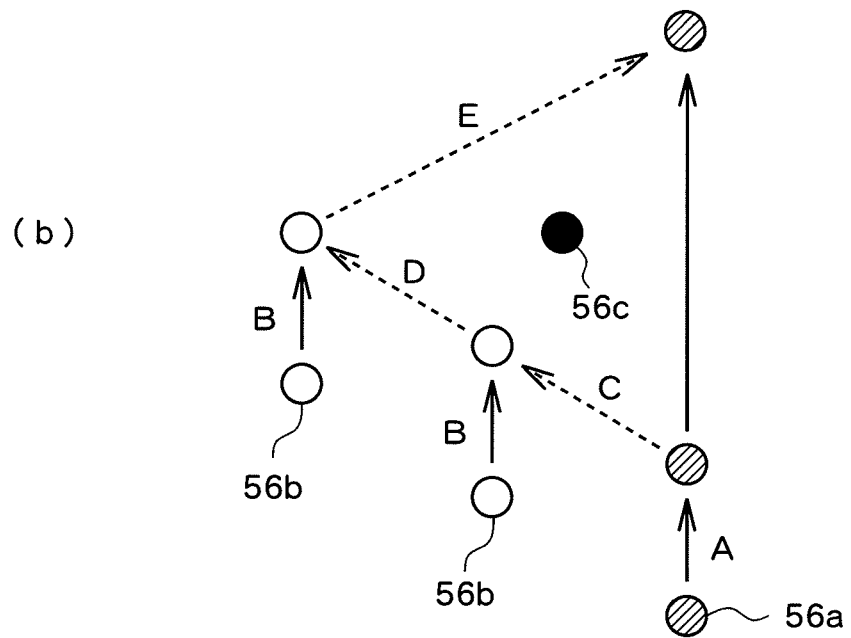
(b)

FIG.8
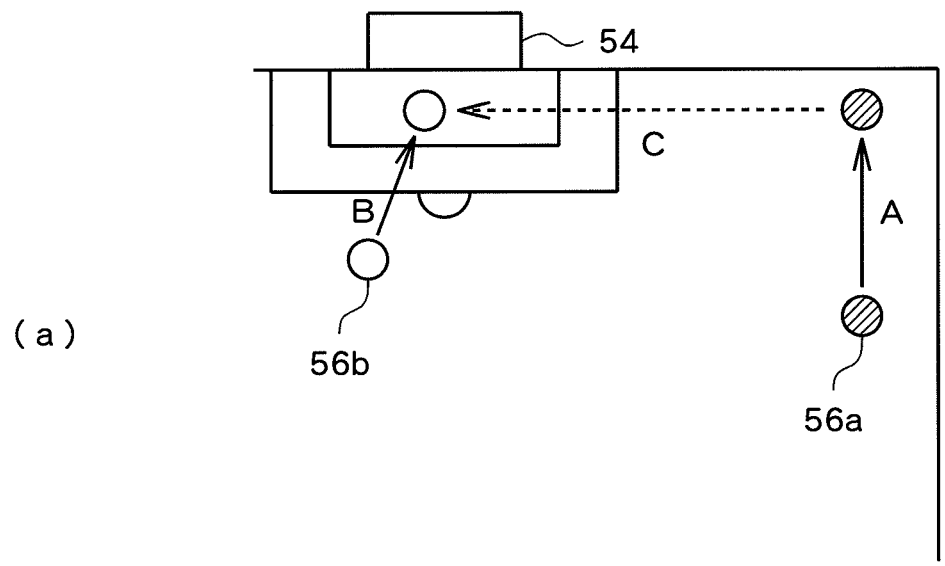
(a)
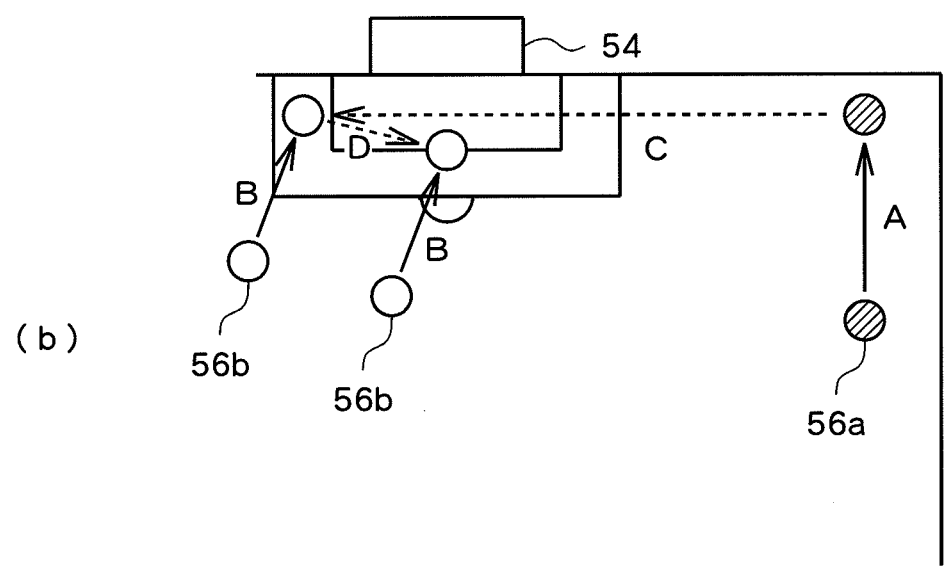
(b)

GAME MACHINE, CONTROL METHOD OF GAME MACHINE AND INFORMATION STORAGE MEDIUM

CROSS-REFERENCE TO RELATED APPLICATION

This application is a divisional application of U.S. patent application Ser. No. 12/159,350 filed Jun. 26, 2008, which is a 371 National Stage Application of PCT/JP2006/320272 filed on Oct. 11, 2006, which claims priority from Japanese Patent Application No. 2005-375992 filed on Dec. 27, 2005, and the entire subject matters of which are incorporated herein by reference.

TECHNICAL FIELD

The present invention relates to a game machine, a control method of the game machine, and an information storage medium.

BACKGROUND ART

There is known a game machine which displays a game screen showing a situation of a game space in which player characters belonging to an operation subject team, player characters belonging to an opposing team, and a moving body character representing a moving body are located, and provides a game of a sport played between the operation subject team and the opposing team by using the moving body. Examples thereof include game machines that provide a soccer game, an ice hockey game, or the like. In the above-described sports game, one of the player characters belonging to the operation subject team is set as an operation subject of a user. In general, the player character set as the operation subject of the user is switched to another according to movement of the moving body (ball, puck, or the like) or a switching operation made by the user.

DISCLOSURE OF THE INVENTION

Problem to be Solved by the Invention

In such a sports game as described above, to cause a plurality of player characters of an operation subject team to perform a linkage play using a pass which is performed by involving the plurality of player characters, a user must perform an operation (including a pass instruction operation) on each of the player characters to be involved in the linkage play while switching the player character to be the operation subject. The above-described operation is hard for the user (particular an inexperienced user) to perform.

The present invention has been made in view of the above-mentioned problem, and an object thereof is to provide a game machine, a control method of a game machine, and an information storage medium for allowing a user to cause a plurality of player characters of an operation subject team to perform a linkage play using a pass which is performed by involving the plurality of player characters with a relatively simple operation.

Means for Solving the Problem

In order to solve the above-mentioned problem, a game machine according to the present invention displays a game screen showing a situation of a game space in which an operation subject player character that acts according to a user's operation, fellow player characters belonging to the same team as the operation subject player character, and a moving body character that represents a moving body are located, and which executes a game of a sport played by using the moving body between the team to which the operation subject player character belongs and an opposing team. The game machine includes: linkage partner selecting means for selecting a linkage partner player character from among the fellow player characters based on the user's operation; type of linkage play selecting means for selecting a type of linkage play; linkage partner control means for controlling a position of the linkage partner player character selected by the linkage partner selecting means based on the type of linkage play selected by the type of linkage play selecting means; and pass execution means for, in the case where a pass instruction operation is performed by the user, causing the operation subject player character to execute a pass in a direction within the game space based on a content of the pass instruction operation if the linkage partner player character has not been selected by the linkage partner selecting means, and causing the operation subject player character to execute a pass to the linkage partner player character if the linkage partner player character has been selected by the linkage partner selecting means.

Further, a control method of a game machine according to the present invention, which displays a game screen showing a situation of a game space in which an operation subject player character that acts according to a user's operation, fellow player characters belonging to the same team as the operation subject player character, and a moving body character that represents a moving body are located, and which executes a game of a sport played by using the moving body between the team to which the operation subject player character belongs and an opposing team, includes: a linkage partner selecting step of selecting a linkage partner player character from among the fellow player characters based on the user's operation; a type of linkage play selecting step of selecting a type of linkage play; a linkage partner control step of controlling a position of the linkage partner player character selected by the linkage partner selecting step based on the type of linkage play selected by the type of linkage play selecting step; and a pass execution step of, in the case where a pass instruction operation is performed by the user, causing the operation subject player character to execute a pass in a direction within the game space based on a content of the pass instruction operation if the linkage partner player character has not been selected by the linkage partner selecting step, and causing the operation subject player character to execute a pass to the linkage partner player character if the linkage partner player character has been selected by the linkage partner selecting step.

A program according to the present invention causes a computer such as a household game machine, an arcade game machine, a portable game machine, a portable cellular telephone, a personal computer, or a server computer to function as a game machine which displays a game screen showing a situation of a game space in which an operation subject player character that acts according to a user's operation, fellow player characters belonging to the same team as the operation subject player character, and a moving body character that represents a moving body are located, and which executes a game of a sport played by using the moving body between the team to which the operation subject player character belongs and an opposing team. The program further causes the computer to function as: linkage partner selecting means for selecting a linkage partner player character from among the fellow player characters based on selecting a type of linkage play; linkage partner control means for controlling a position of the linkage partner player character selected by the linkage partner selecting means based on the type of linkage play selected by the type of linkage play selecting means; and pass execution means for, in the case where a pass instruction operation is performed by the user, causing the operation subject player character to execute a pass in a direction within the game space based on a content of the pass instruction operation if the linkage partner player character has not been selected by the linkage partner selecting means, and causing the operation subject player character to execute a pass to the linkage partner player character if the linkage partner player character has been selected by the linkage partner selecting means.

Further, an information storage medium according to the present invention is a computer-readable information storage medium recorded with the above-mentioned program. Further, a program distribution device according to the present invention is a program distribution device that includes an information storage medium recorded with the above-mentioned program and reads out and distributes the above-mentioned program from the information storage medium. Further, a program distribution method according to the present invention is a program distribution method for using an information storage medium recorded with the above-mentioned program and reading out and distributing the above-mentioned program from the information storage medium.

The present invention relates to a game machine which displays a game screen showing a situation of a game space in which an operation subject player character that acts according to a user's operation, fellow player characters belonging to the same team as the operation subject player character, and a moving body character representing a moving body are located, and which executes a game of a sport played by using the moving body between the team to which the operation subject player character belongs and an opposing team. In the present invention, a linkage partner player character is selected from among the fellow player characters based on the user's operation. Also in the present invention, a type of linkage play is selected. Further, the position of the linkage partner player character is controlled based on the type of linkage play. In a case where the user performs a pass instruction operation, if the linkage partner player character is not selected, the operation subject player character is caused to execute a pass in a direction based on the content of the pass instruction operation. On the other hand, if the linkage partner player character is selected, the operation subject player character is caused to execute a pass to the linkage partner player character. According to the present invention, a user can cause a plurality of player characters of the operation subject team to perform the linkage play using a pass which is performed by involving the plurality of player characters with a relatively simple operation.

BRIEF DESCRIPTION OF THE DRAWINGS

FIG. 2 are diagrams showing an example of a controller.

FIG. 7 are diagrams for explaining a linkage play "one-two pass".

FIG. 8 are diagrams for explaining a linkage play "cross".

BEST MODE FOR CARRYING OUT THE INVENTION

An in-depth description of an example of an embodiment of the present invention will hereinafter be made based on the drawings.

Figure 1:
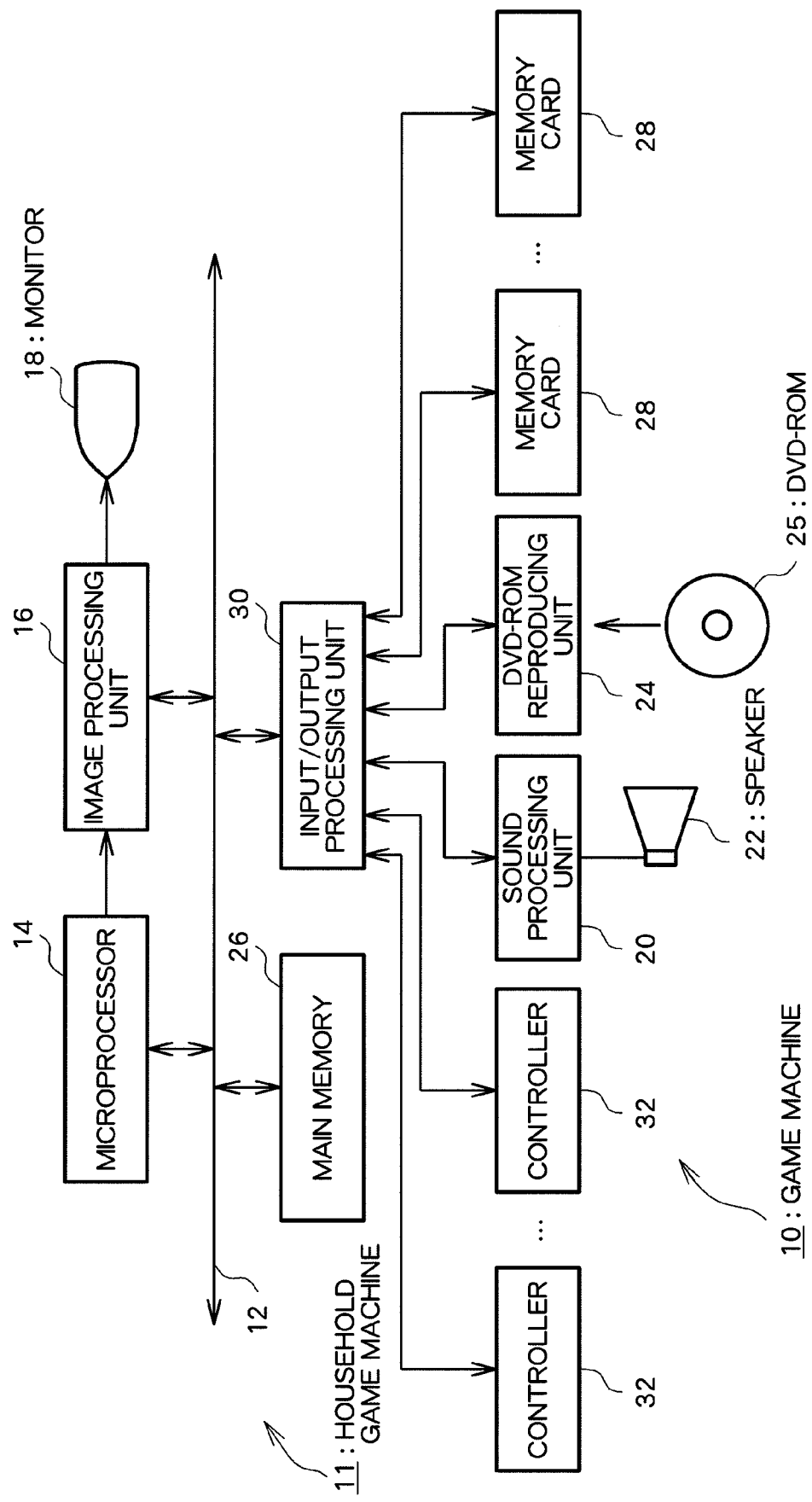
FIG. 1 is a diagram showing a hardware configuration of a game machine according to this embodiment.

FIG. 1 is a diagram illustrating a hardware structure of a game machine according to the embodiment of the present invention. A game machine 10 illustrated in FIG. 1 has a structure in which a DVD-ROM 25 and memory cards 28, or information storage media, are inserted into a household game machine 11, and a monitor 18 and a loudspeaker 22 are connected to the household game machine 11. For example, a home TV receiving set is used for the monitor 18, and a built-in loudspeaker thereof is used for the loudspeaker 22.

The household game machine 11 is a well-known computer game system including a bus 12, a microprocessor 14, an image processing unit 16, a sound processing unit 20, a DVD-ROM reproducing unit 24, a main memory 26, an input/output (I/O) processing unit 30, and controllers 32. An enclosure accommodates the components other than the controllers 32.

The bus 12 is used, via which addresses and data are transmitted and received by the respective units of the household game machine 11. The microprocessor 14, the image processing unit 16, the main memory 26, and the I/O processing unit 30 are connected to each other via the bus 12 so as to be communicable with each other.

The microprocessor 14 controls the individual units of the household game machine 11 on the basis of an operating system (OS) stored in a ROM (not shown), a program read from the DVD-ROM 25, and data read from the memory card 28. The main memory 26 is a memory including, for example, a RAM, and the program read from the DVD-ROM 25 and the data read from the memory card 28 are written in the main memory 26 if necessary. The main memory 26 is also employed as a working memory for the microprocessor 14.

The image processing unit 16 includes a VRAM and renders, based on the image data sent from the microprocessor 14, a game screen in the VRAM. Then, the image processing unit 16 converts a content thereof into video signals and outputs the video signals to the monitor 18 at predetermined timings.

The I/O processing unit 30 is an interface used for the microprocessor 14 to access the sound processing unit 20, the DVD-ROM reproducing unit 24, the memory card 28, and the controller 32. The sound processing unit 20, the DVD-ROM reproducing unit 24, the memory card 28, and the controller 32 are connected to the I/O processing unit 30.

The sound processing unit 20, which includes a sound buffer, reproduces and outputs, from the loudspeaker 22, various sound data such as game music, game sound effect, and messages that are read from the DVD-ROM 25 and stored in the sound buffer.

The DVD-ROM reproducing unit 24 reads the program recorded on the DVD-ROM 25 in accordance with an instruction given from the microprocessor 14. It is to be noted that, in this case, the DVD-ROM 25 is employed for supplying the program to the household game machine 11. However, any of various other information storage media such as CD-ROMs and ROM cards may also be used. Further, the program may also be supplied to the household game machine 11 from a far-off area via a data communication network such as the Internet.

The memory card 28 includes a nonvolatile memory (e.g., an EEPROM). The household game machine 11 has multiple memory card slots into which the memory cards 28 are inserted, and the multiple memory cards 28 can be simultaneously inserted. The memory card 28 is constructed so that the memory card 28 can be inserted into and removed from the memory card slot, and is employed for storing various game data such as save data.

The controller 32 is a general-purpose operation input means used for a player to input a variety of game operations. The I/O processing unit 30 scans statuses of the respective portions of the controller 32 at an interval of a fixed period (e.g., every 1/60 sec), and transfers operation signals representing scanned results to the microprocessor 14 via the bus 12. The microprocessor 14 determines, based on this operation signal, the game operation of the player. The household game machine 11 is configured to be connectable with the multiple controllers 32, and the microprocessor 14 controls the game on the basis of the operation signals inputted from the respective controllers 32.

FIG. 2 are diagrams showing an example of the controller 32. The controller 32 shown in FIG. 2 is a general-purpose game controller. As shown in FIG. 2(*a*), the controller 32 is connected to the household game machine 11 through a controller cable 43, and has a direction button group 34 and a left operation stick 36 formed on the left side of a surface 32*a*, and has buttons 38X, 38Y, 38A, and 38B and a right operation stick 37 formed on the right side of a surface 32*a*. In addition, as shown in FIG. 2(*b*), the buttons 40L, 40R, formed on the top surface on the left and right sides thereof closer to the surface 32*a*, and the buttons 42L, 42R, similarly formed but closer to the rear surface. The direction button group 34 is usually used for setting a moving direction of a character and a cursor. The buttons 38X, 38Y, 38A, 38B, 40L, 40R, 42L, and 42R are used for various game operations. The left operation stick 36 and the right operation stick 37 are a stick-shape operation members that stand upright on the surface of the casing of the controller 32, and can be tilted freely from the upright state toward all azimuths by a predetermined angle. The household game machine 11 receives an input of numerical values indicating the current tilt states (postures) of the left operation stick 36 and the right operation stick 37. The left operation stick 36 and the right operation stick 37 are usually used for setting the moving direction of the character and the cursor similarly to the direction button group 34. Note that in the following description, the direction button group 34 is used for various direction instruction operations, but for example, the left operation stick 36 may be used for the various direction instruction operations.

The game machine 10 having the above-mentioned hardware configuration provides a soccer game in which the user operates a player object (player character object that indicates a soccer player) belonging to the operation subject team (hereinafter, referred to as "user team"), and aims to generate more scoring events than the opposing team. This soccer game is implemented by execution of a soccer game program read out from the DVD-ROM 25.

On the game machine 10, a virtual three-dimensional space (game space) is created in the main memory 26 by the execution of the above-mentioned soccer game program. The monitor 18 displays a game screen showing the picture obtained by viewing the virtual three-dimensional space from a given viewpoint. The user enjoys playing the soccer game by operating the controller 32 while watching the game screen displayed on the monitor 18.

Figure 3:
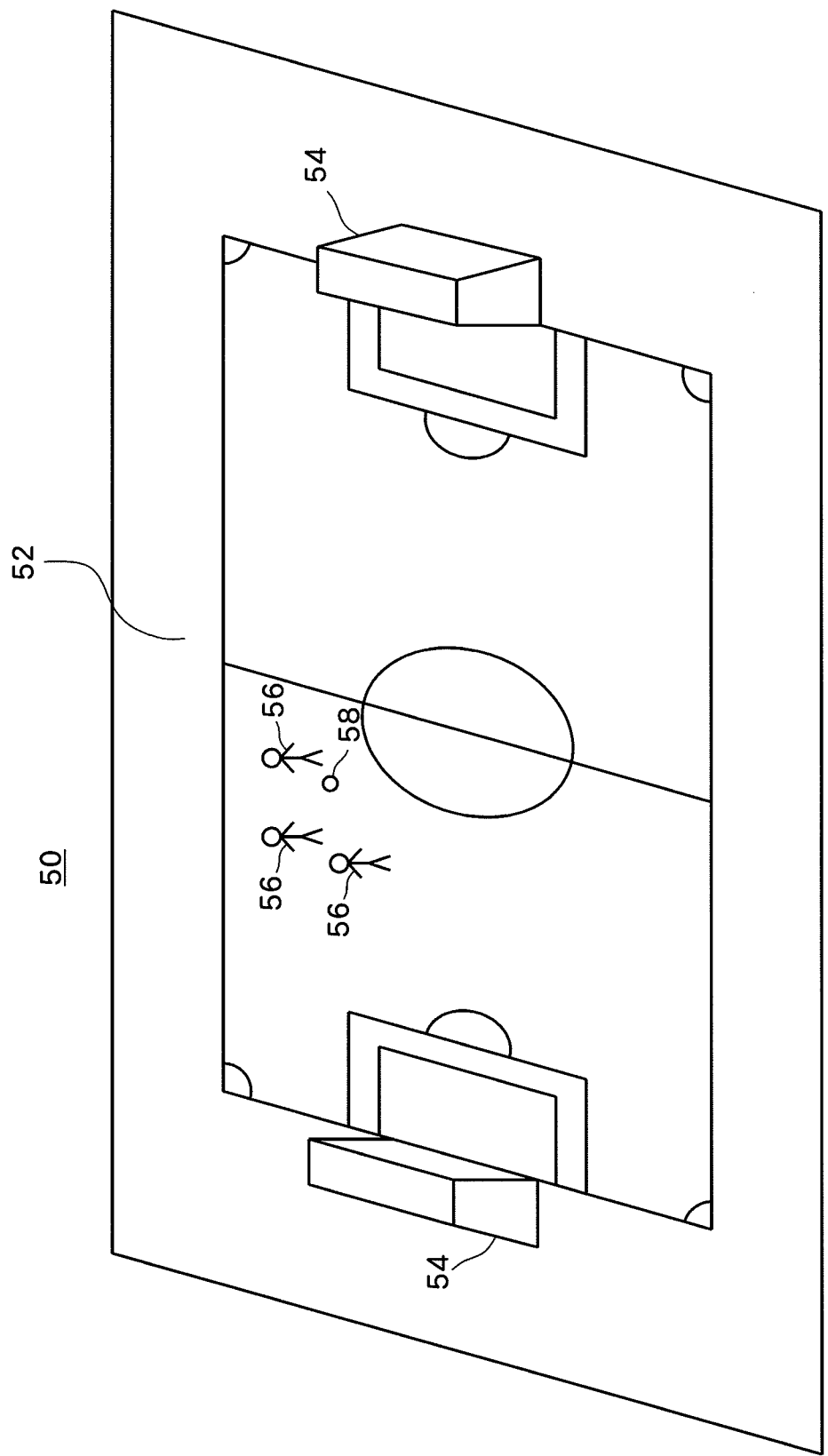
FIG. 3 is a perspective view showing an example of a virtual three-dimensional space.

FIG. 3 shows an example of the virtual three-dimensional space created in the main memory 26. As shown in FIG. 3, a field object 52 representing a soccer pitch and goal objects 54 are located in a virtual three-dimensional space 50, which forms a field to be a stage for a soccer match. Each of the goal objects 54 is associated with one of the user team and the opposing team.

A ball object 58 representing a soccer ball is located on the field object 52. In addition, player objects 56 are located on the field object 52. FIG. 3 shows only 3 player objects 56, but 19 other player objects 56 are also located on the field object 52. The player objects 56 each belong to one of the user team or the opposing team.

One of the player objects 56 belonging to the user team is set as the operation subject of the user. The position and posture of the player object 56 of the user's operation subject (hereinafter, referred to as "operation subject player object") in the virtual three-dimensional space 50 vary according to the operation signal inputted from the controller 32.

When the operation subject player object comes close to the ball object 58, the operation subject player object and the ball object 58 are associated with each other under predetermined conditions. In this situation, the ball object 58 moves according to the movement of the operation subject player object. This manner is displayed on the monitor 18 as a dribble action of the player object 56. Further, in a state in which the operation subject player object and the ball object 58 are associated with each other, by operating the controller 32, the user can cause the operation subject player object to kick the ball object 58. In other words, the user can cause the operation subject player object to perform a pass, cross, or shot.

Of the player objects 56 belonging to the user team, the player objects 56 other than the operation subject player object (hereinafter, referred to as "fellow player object") are automatically controlled by the computer according to a predetermined algorithm.

The operation subject player object is switched from one of the player objects 56 belonging to the user team to another thereof according to the switching operation made by the user or the movement of the ball object 58. By operating the operation subject player object being thus switched, the user aims to shoot the ball object 58 into the goal object 54 of the opposing team to generate a scoring event.

Figure 4:
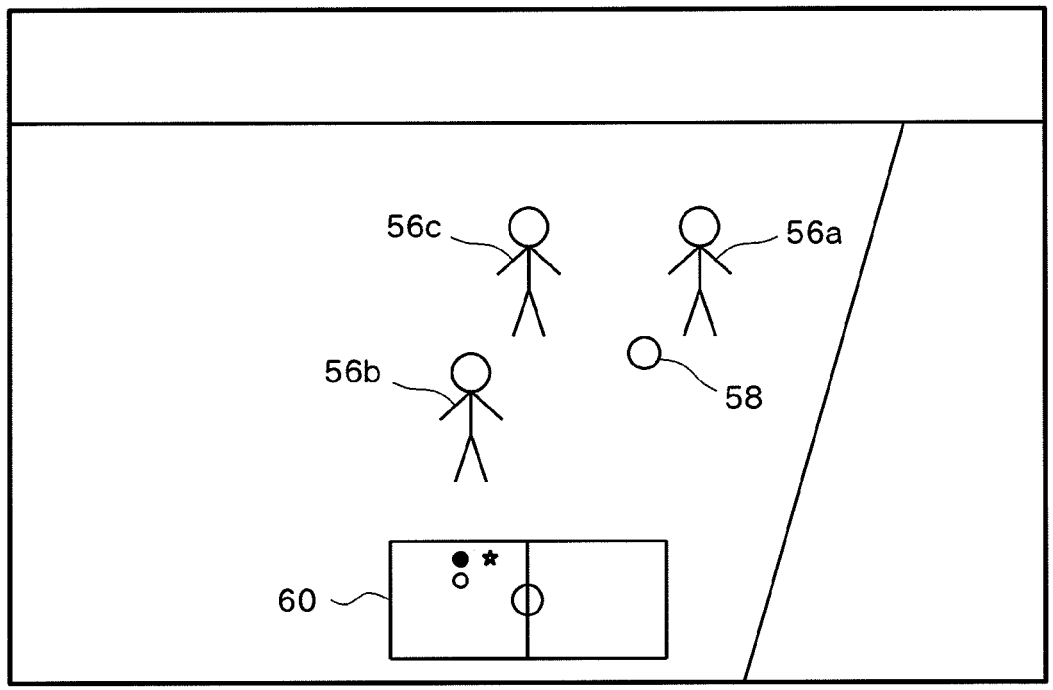
FIG. 4 is a diagram showing an example of a game screen.

FIG. 4 shows an example of the game screen displayed on the monitor 18. As shown in FIG. 4, the game screen shows the picture obtained by viewing the virtual three-dimensional space 50 from a given viewpoint. An operation subject player object 56*a*, a fellow player object 56*b*, and a player object belonging to the opposing team (hereinafter, referred to as "opposing player object") 56*c* are displayed in the game screen shown in FIG. 4.

A radar 60 is also displayed in the game screen. The radar 60 indicates the positions of the respective player objects 56 on the field object 52. The radar 60 shows the player objects 56 belonging to the user team and the player objects 56 belonging to the opposing team separately one from the other. Further, the operation subject player object is displayed distinctly from the player objects 56 belonging to the user team. The radar 60 shown in FIG. 4 indicates the position of the operation subject player object 56a by an asterisk. In addition, the position of the fellow player object 56b is indicated by a white circle, while the position of the opposing player object 56c is indicated by a black circle. Note that the radar 60 shown in FIG. 4 indicates the positions of only 3 player objects 56, but the actual radar 60 indicates the positions of 22 player objects 56.

When the user performs a dribble instruction operation (operation of the direction button group 34 in this embodiment), the game screen shows the operation subject player object 56a performing a dribble. Further, when the user performs a short pass instruction operation or a long pass (including cross) instruction operation, the game screen shows the operation subject player object 56a performing a short pass or a long pass, respectively. In the case of this embodiment, the short pass instruction operation is an operation using the direction button group 34 and the button 38A, and the long pass instruction operation is an operation using the direction button group 34 and the button 38B. To be specific, the operation subject player object 56a performs a short pass when the depression of button 38A is released after the button 38A is depressed. The direction of the pass (moving direction of the ball object 58) at this time is decided based on the depressed state of the direction button group 34 when the button 38A is depressed.

In addition, the strength of the pass (initial velocity of the ball object 58) is decided according to the length of time elapsing from the depression of the button 38A until the release of the depression. The same applies to the long pass.

According to this embodiment, the user can cause the operation subject player object 56a and the fellow player objects 56b to perform a "linkage attack using a pass" with a relatively simple operation. Hereinafter, description will be made of this linkage play aiding function.

Figure 5:
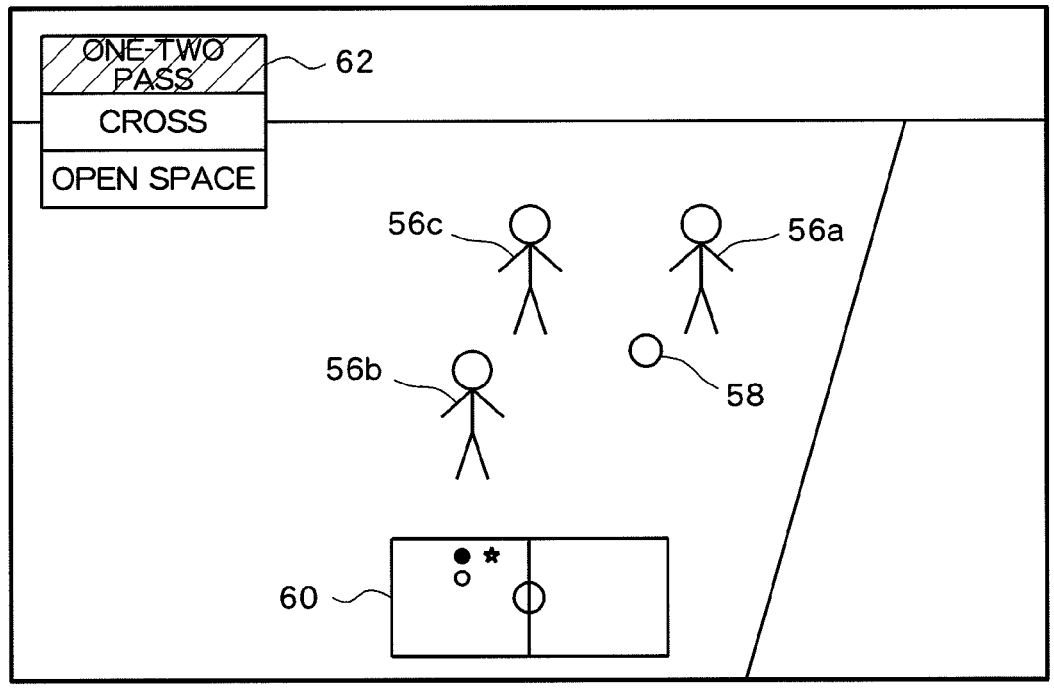
FIG. 5 is a diagram showing another example of the game screen.

In this embodiment, when the user performs a predetermined operation (depression of the button 42L in this embodiment), the user is guided to select a desired linkage play. FIG. 5 is a diagram showing an example of the game screen of this case. As shown in FIG. 5, a linkage play selection guide image 62 is displayed in the game screen. In the linkage play selection guide image 62, a list of linkage plays that can be selected by the user is displayed. In this embodiment, there are 3 types of linkage plays "one-two pass", "cross", and "open space" provided as the linkage plays that can be selected by the user. The details of those linkage plays will be described later.

Figure 6:
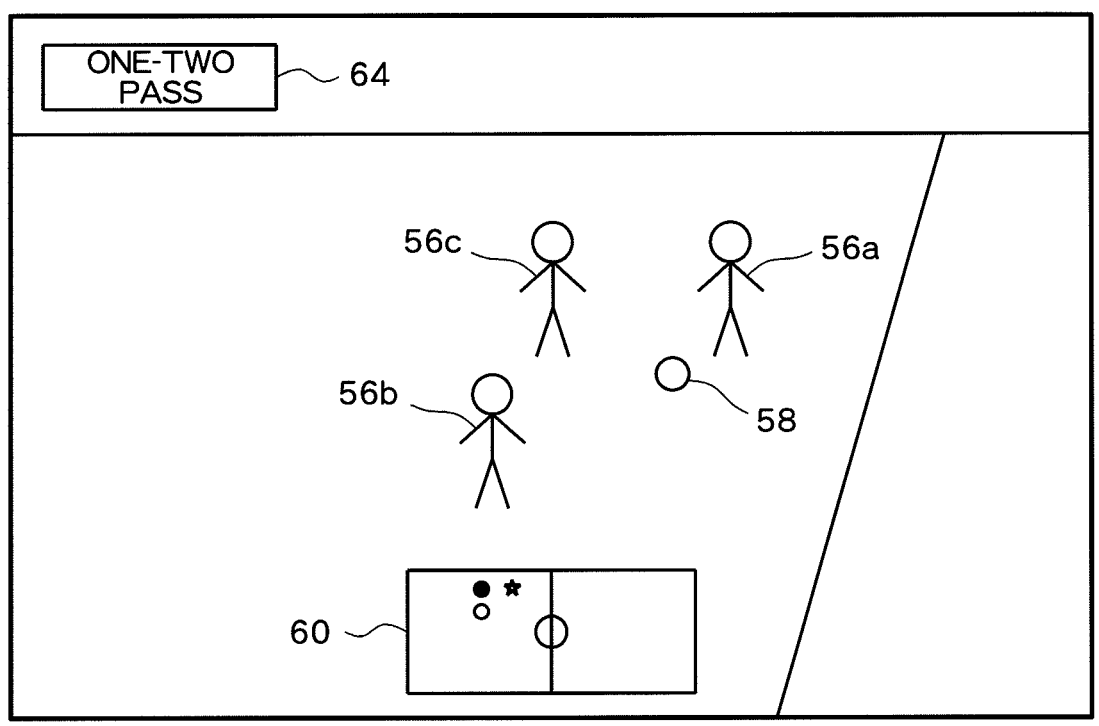
FIG. 6 is a diagram showing another example of the game screen.

In the linkage play selection guide image 62, one of the linkage plays is highlighted. Each time the button 40L is depressed, the highlighted linkage play is changed from one linkage play to another in the order of "one-two pass", "cross", "open space", "one-two pass", "cross", "open space", and the like. Further, when the button 40R is depressed, the linkage play highlighted at that point in time is decided as an execution subject linkage play. FIG. 6 is a diagram showing an example of the game screen shown after the execution subject linkage play is decided. As shown in FIG. 6, an execution subject linkage play guide image 64 is displayed in the game screen of this case. The execution subject linkage play guide image 64 indicates the linkage play selected by the user.

When the execution subject linkage play is decided, a partner for the linkage play is selected from among the fellow player objects 56b. The partner for the linkage play is automatically selected based on, for example, the type of linkage play selected by the user, the position of the operation subject player object 56a, the position of the fellow player objects 56b, and the like. Note that the following description will be given mainly for a case where one fellow player object 56b is selected as the partner for the linkage play, but a plurality of fellow player objects 56b may be selected as the partners for the linkage play. Further, in the following description, the fellow player object 56b selected as the partner for the linkage play is called a linkage partner player object.

Herein, description will be given of actions of the operation subject player object and the linkage partner player object in each 20 case where a given linkage play is selected.

FIG. 7 are diagrams for explaining the actions of the operation subject player object 56a and the linkage partner player object 56b (fellow player object 56b selected as the partner for the linkage play) in the case where a "one-two pass" is selected.

As shown in FIG. 7(*a*), in this case, when the operation subject player object 56a performs a dribble (A), the linkage partner player object 56b runs parallel to the operation subject player object 56a (B). At this time, when the user depresses the button 38A (short pass instruction button), the operation subject player object 56a performs a short pass, and the ball object 58 starts to move toward the linkage partner player object 56b irrespective of the operation state of the direction button group 34 (C). Further, at this time, when the user depresses the button 38A (short pass instruction button) around the time when the ball object 58 reaches the linkage partner player object 56b, the linkage partner player object 56b performs a short pass, and the ball object 58 starts to move toward the operation subject player object 56a irrespective of the operation state of the direction button group 34 (D).

Note that the pass (D) from the linkage partner player object 56b to the operation subject player object 56a may be performed automatically irrespective of whether or not the button 38A (short pass instruction button) is depressed. Further, in order to execute the pass from the linkage partner player object 56b to the operation subject player object 56a, it may be judged whether or not the operation subject player object 56a moves to a position where the operation subject player object 56a can receive the pass from the linkage partner player object 56b. In other words, it may be judged whether or not the pass from the linkage partner player object 56b to the operation subject player object 56a is blocked by the opposing player object 56c with a high probability based on the positions of the operation subject player object 56a, the linkage partner player object 56b, and opposing player object 56c. Only if it is judged that the operation subject player object 56a has moved to the position where the operation subject player object 56a can receive the pass from the linkage partner player object 56b, the pass from the linkage partner player object 56b to the operation subject player object 56a may be executed automatically or according to the depression operation of the button 38A (short pass instruction button).

Note that if a plurality of linkage partner player objects 56b are selected, for example, as shown in FIG. 7(*b*), the plurality of linkage partner player objects 56b run parallel to the dribble (A) of the operation subject player object 56a (B). When the button 38A (short pass instruction button) is depressed, a pass is executed from the operation subject player object 56a to one of the linkage partner player objects 56b (for example, one closest to the operation subject player object 56a) (C). If the ball object 58 reaches the linkage partner player object 56b; a pass is executed to another one of the linkage partner player objects 56b automatically or according to the depression operation of the button 38A (short pass instruction button) (D). In this case, the pass (D) maybe executed only if it is judged that the operation subject player object 56a has not moved to the position where the operation subject player object 56a can receive the pass from the linkage partner player object 56b. If it is judged that the operation subject player object 56a has moved to the position where the operation subject player object 56a can receive the pass from the linkage partner player object 56b, the pass to the operation subject player object 56a may be executed. Note that if the pass (D) from the linkage partner player object 56b to another linkage partner player object 56b is executed, a pass is executed from the another one of the linkage partner player objects 56b to the operation subject player object 56a automatically or according to the depression operation of the button 38A (short pass instruction button) (E).

Accordingly, by selecting "one-two pass" as the linkage play, the user can perform a linkage attack using a dribble and a one-two pass (wall pass) with a relatively simple operation.

FIG. 8 are diagrams for explaining the actions of the operation subject player object 56a and the linkage partner player 10 object 56b in the case where "cross" is selected.

As shown in FIG. 8(*a*), in this case, in synchronization with the operation subject player object 56a moving forward along the side (A), the linkage partner player object 56b moves toward the front-of the goal of the opposing team (B). Herein, when the user depresses the button 38B (cross instruction button), the operation subject player object 56a performs a cross, and the ball object 58 starts to move toward the linkage partner player object 56b irrespective of the operation state of the direction button group 34 (C). In this case, when the user performs a shot instruction operation (in this embodiment, depression of the button 38X) around the time when the ball object 58 reaches the linkage partner player object 56b, a header shot or a volley shot is executed. Note that the shot by the linkage partner player object 56b may be performed automatically irrespective of whether or not there is a shot instruction operation.

Note that if a plurality of linkage partner player objects synchronization with the operation subject player object 56a moving forward along the side (A), the plurality of linkage partner player objects 56b move toward the front of the opposing goal (B). When the button 38B (cross instruction button) is depressed, a cross is executed from the operation subject player object 56a to one of the linkage partner player objects 56b (C). If the ball object 58 reaches the linkage partner player object 56b, a pass is executed to another one of the linkage partner player objects 56b automatically or according to the depression operation of the button 38A or 38B (short pass or long pass instruction button) (D). In this case, the pass (D) may be executed only if it is judged that the shot by the linkage partner player object 56b who has received the pass from the operation subject player object 56a is blocked with a high probability. If it is judged that the shot by the linkage partner player object 56b is blocked with a low probability, the shot may be executed by the linkage partner player object 56b who has received the pass from the operation subject player object 56a. Note that if the pass (D) from the linkage partner player object 56b to another linkage partner player object 56b is executed, a shot is executed by the another one of the linkage partner player objects 56b automatically or according to the shot instruction operation. Accordingly, by selecting "cross" as the linkage play, the user can perform a linkage attack using a cross with a relatively 25 simple operation.

Figure 9:
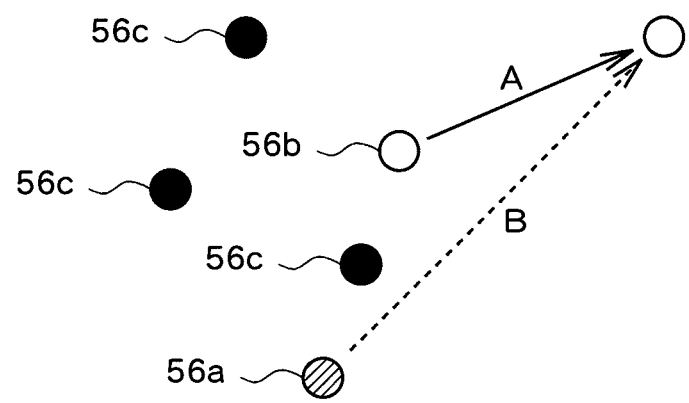
FIG. 9 is a diagram for explaining a linkage play "open space".

FIG. 9 is a diagram for explaining the actions of the operation subject player object 56a and the linkage partner player object 56b in the case where "open space" is selected as the execution subject linkage play.

In this case, the linkage partner player object 56b finds an open space and moves there (A). Herein, the open space represents an area around which no player objects 56 is located. At this time, when the user depresses the button 38A or 38B, the operation subject player object 56a performs a short pass or a long pass, and the ball object 58 starts to move toward the linkage partner player object 56b irrespective of the operation state of the direction button group 34 (B). In this case, when the ball object 58 comes close to the linkage partner player object 56b, the operation subject is switched to the linkage partner player object 56b, and the linkage partner player object 56b performs various actions according to the user's operation. Note that in this case, the operation subject may not be switched to the linkage partner player object 56b. In other words, the linkage partner player object 56b who has received the pass from the operation subject player object 56a may perform the various actions automatically according to a predetermined algorithm.

Note that if a plurality of linkage partner player objects 56b are selected, each of the linkage partner player objects 56b finds an open space and moves there. When the user depresses the button 38A or 38B, the operation subject player object 56a performs a short pass or a long pass, and the ball object 58 starts to move toward one of the linkage partner player objects 56b (for example, one closest to the operation subject player object 56a or one closest to the opposing goal object 54) irrespective of the operation state of the direction button group 34. Accordingly, by selecting "open space" as the linkage play, the user can perform a linkage attack using an open space with a relatively simple operation. Note that the linkage play selected by the user is canceled in a case where, for example, the ball object 58 is placed under the control of the opposing team. Alternatively, the linkage play maybe canceled in a case where, for example, the operation subject player object 56a is switched to another player object 56.

Figure 10:
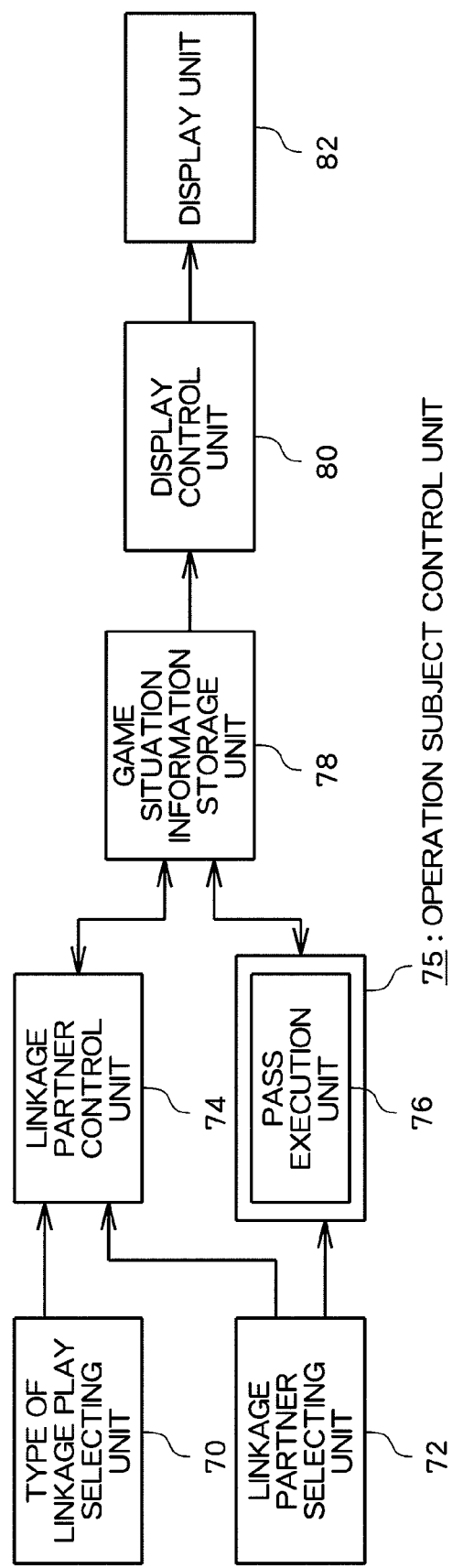
FIG. 10 is a diagram showing functional blocks of the game machine according to this embodiment.

Next, description will be given of a functional configuration for implementing the linkage play aiding function. FIG. 10 is a functional block diagram of the game machine 10. As shown in FIG. 10, the game machine 10 functionally includes a type of linkage play selecting unit 70, a linkage partner selecting unit 72, a linkage partner control unit 74, an operation subject control unit 75, a game situation information storage unit 78, a display control unit 80, and a display unit 82. Those functions are implemented by the microprocessor 14 executing a program supplied via the DVD-ROM 25 or the communication network.

[Game Situation Information Storage Unit]

The game situation information storage unit 78 is implemented mainly by the main memory 26, and stores game situation information that indicates the situation of a game. In the case of this embodiment, the game situation information includes information indicating, for example, states (such as a position, a posture, a moving direction, a moving velocity, a type of motion data being reproduced, and a reproduction position of the motion data) of each of the player objects 56, and states (such as a position, a moving direction, and a moving velocity) of the ball object 58, the objects being located in the virtual three-dimensional space 50.

[Type of Linkage Play Selecting Unit and Linkage Partner Selecting Unit]

The type of linkage play selecting unit 70 and the linkage partner selecting unit 72 are implemented mainly by the microprocessor 14. The type of linkage play selecting unit 70 selects at least one of a plurality of linkage plays. The linkage partner selecting unit 72 selects at least one of the fellow player objects 56b as the partner for the linkage play (linkage partner player object).

In the case of this embodiment, the type of linkage play selecting unit 70 selects one of the plurality of linkage plays according to the operation of the controller 32. To be specific, the type of linkage play selecting unit 70 displays the linkage play selection guide image 62 on the game screen, and receives a selection operation from the user. Then, the type of linkage play selecting unit 70 selects the linkage play according to the selection operation.

Also in the case of this embodiment, the linkage partner selecting unit 72 selects one of the fellow player objects 56b as the linkage partner player object based on the type of linkage play selected by the type of linkage play selecting unit 70.

If, for example, "one-two pass" is selected, the linkage partner selecting unit 72 selects the fellow player object 56b closest to the operation subject player object 56a as the linkage partner player object based on the position of the operation subject player object 56a and the positions of the respective fellow player objects 56b.

If, for example, "cross" is selected, the linkage partner selecting unit 72 selects the fellow player object 56b closest to the goal object 54 of the opposing team as the linkage partner player object based on the positions of the respective fellow player objects 56b.

If, for example, "open space" is selected, the linkage partner selecting unit 72 specifies an open space based on the positions of the opposing player objects 56c, and selects the fellow player object 56b closest to the open space as the linkage partner player object.

Note that in this embodiment, the linkage partner-selecting unit 72 is configured to automatically select the linkage partner player object, but the linkage partner selecting unit 72 may be configured to guide the user to select the linkage partner player object, and select the linkage partner player object according to the selection operation performed by the user. For example, the linkage partner selecting unit 72 may display a list of the fellow player objects 56b on the game screen to thereby cause the user to select the linkage partner player object from the list. Alternatively, for example, the linkage partner selecting unit 72 may cause the user to select one of the images (white circles) within the radar 60 which indicate the respective fellow player objects 56b to thereby cause the user to select the linkage partner player object.

Further, in this embodiment, after the selection is made by the type of linkage play selecting unit 70, the selection is made by the linkage partner selecting unit 72, but the selection may be made by the type of linkage play selecting unit 70 after the selection is made by the linkage partner selecting unit 72. In this case, for example, when the distance between the linkage partner player object selected by the linkage partner selecting unit 72 and the operation subject player object 56a is less than a predetermined distance, the type of linkage play selecting unit 70 may automatically select "one-two pass" as the linkage play. Further, for example, when the linkage partner player object selected by the linkage partner selecting unit 72 is located within a range of a predetermined distance from the goal object 54 of the opposing team, -and the operation subject-player object 56a is located on the side (in the area of a predetermined distance from a sideline), the type of linkage play selecting unit 70 may automatically select "cross" as the linkage play.

[Linkage Partner Control Unit]

The linkage partner control unit 74 is implemented mainly by the microprocessor 14. Based on the type of linkage play selected by the type of linkage play selecting unit 70, the linkage partner control unit 74 controls the states (such as the position and the posture) of the fellow player object 56b (linkage partner player object) selected as the partner by the linkage partner selecting unit 72.

For example, if the linkage play selected by the type of linkage play selecting unit 70 is "one-two pass", the linkage partner control unit 74 updates the states of the linkage partner player object held in the game situation information storage unit 78 so that the linkage partner player object moves according to the movement of the operation subject player object 56a. Also in this case, if the linkage partner player object receives the pass from the operation subject player object 56a (or another linkage partner player object), the linkage partner control unit 74 updates the states (such as the position and the posture) of the linkage partner player object held in the game situation information storage unit 78 so that the linkage partner player object performs a pass action to the operation subject player object 56a (or another linkage partner player object) automatically (according to a predetermined algorithm) or according to the pass instruction operation made by the user.

Further, for example, if the linkage play selected by the type of linkage play selecting unit 70 is "cross", the linkage partner control unit 74 updates the states of the linkage partner player object held in the game situation information storage unit 78 so that the linkage partner player object moves toward the goal object 54 of the opposing team. Also in this case, if the linkage partner player object receives the pass from the operation subject player object 56a (or another linkage partner player object), the linkage partner control unit 74 updates the states (such as the position and the posture) of the linkage partner player object held in the game situation information storage unit 78 so that the linkage partner player object performs a shot action or a pass action to the operation subject player object 56a (or another linkage partner player object) automatically (according to a predetermined algorithm) or according to the user's operation.

Further, for example, if the linkage play selected by the type of linkage play selecting unit 70 is "open space", the linkage partner control unit 74 specifies an open space based on the positions of the respective opposing player objects 56c. Then, the linkage partner control unit 74 updates the states of the linkage partner player object held in the game situation information storage unit 78 so that the linkage partner player object moves toward the open space. Also in this case, if the linkage partner player object receives the pass from the operation subject player object 56a, the linkage partner control unit 74 updates the states (such as the position and the posture) of the linkage partner player object held in the game situation information storage unit 78 so that the linkage partner player object performs each of various actions automatically (according to a predetermined algorithm) or according to the user's operation.

[Operation Subject Control Unit]

The operation subject control unit 75 is implemented mainly by the microprocessor 14. The operation subject control unit 75 causes the operation subject player object 56a to perform each of various actions including a movement (dribble) action, a shot action, or the like, according to the user's operation.

[Pass Execution Unit]

The operation subject control unit 75 includes a pass execution unit 76. The pass execution unit 76 causes the operation subject player object 56a to perform a pass (short pass or long pass) according to the user's pass instruction operation (short pass instruction operation or long pass instruction operation).

If the partner for the linkage play is not selected by the linkage partner selecting unit 72, the pass execution unit 76 identifies the direction within the virtual three-dimensional space 50 which corresponds to the content of the pass instruction operation, and causes the operation subject player object 56a to perform a pass in that direction. On the other hand, if the partner for the linkage play is selected by the linkage partner selecting unit 72, the pass execution unit 76 causes the operation subject player object 56a to perform a pass to the fellow player object 56b selected as the partner for the linkage play by the linkage partner control unit 74.

Note that to cause the operation subject player object 56a and the linkage partner player object to perform various actions, the linkage partner control unit 74 and the operation subject control unit 75 (pass execution unit 76) change the postures of the operation subject player object 56a and the linkage partner player object held in the game situation information storage unit 78 according to the motion data representing the various actions (for example, pass action and the like). Further, to cause the operation subject player object 56a and the linkage partner player object to perform a pass or a shot, the linkage partner control unit 74 and the operation subject control unit 75 (pass execution unit 76) update the position of the ball object 58 held in the game situation information storage unit 78 every predetermined time so that the ball object 58 moves toward a target direction.

[Display Control Unit and Display Unit]

The display control unit 80 is implemented mainly by the microprocessor 14, the main memory 26, and the image processing unit 16. The display unit 82 is implemented mainly by the monitor 18. The display control unit 80 creates in the main memory 26 the virtual three-dimensional space 50 in which the respective player objects 56 and the ball object 58 are located based on the storage content of the game situation information storage unit 78. Then, the display control unit 80 generates a game screen showing the picture obtained by viewing the virtual three-dimensional space 50 from a given viewpoint, and causes the display unit 82 to display the game screen.

Figure 11:
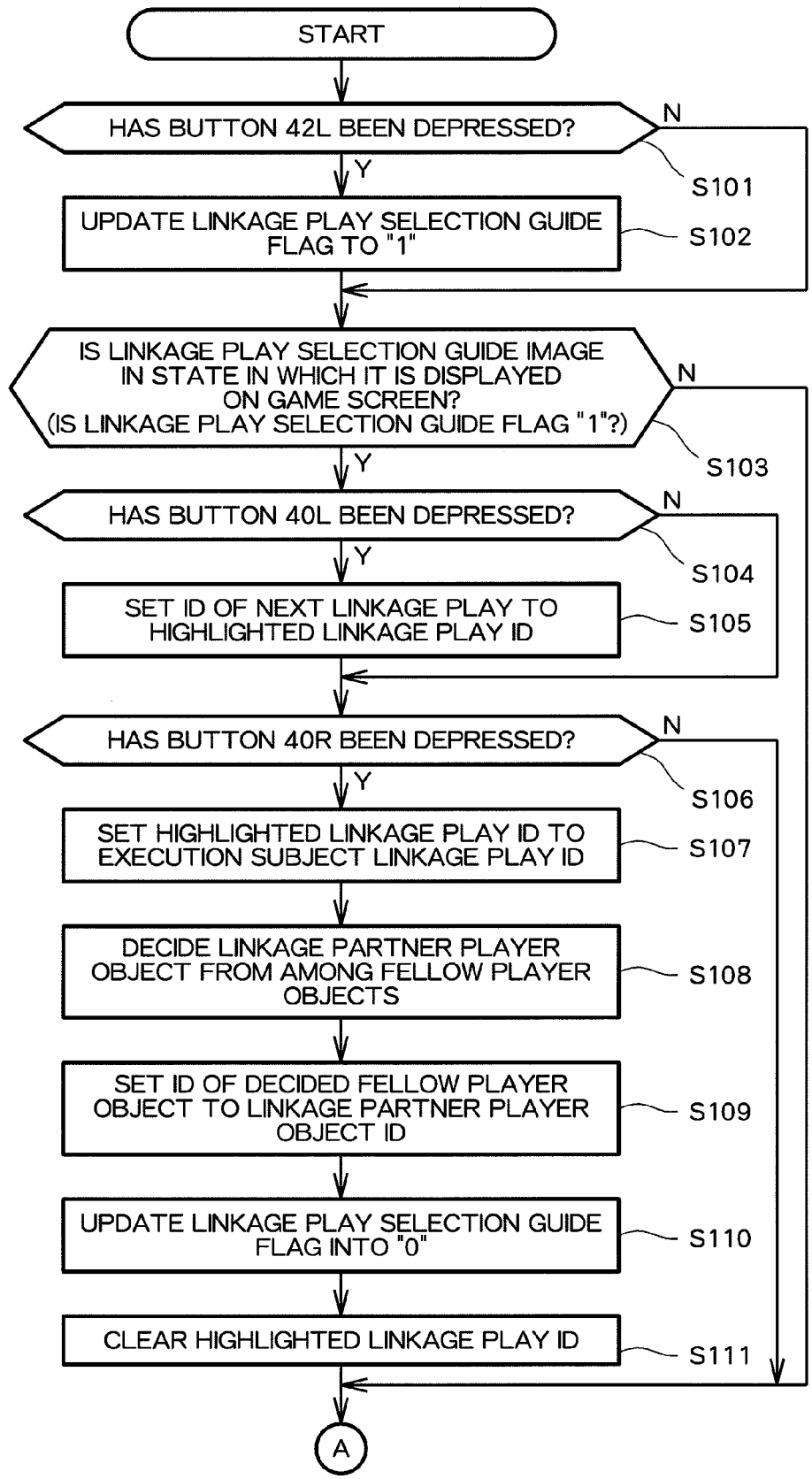
FIG. 11 is a flowchart showing processing executed on the game machine.
Figure 12:
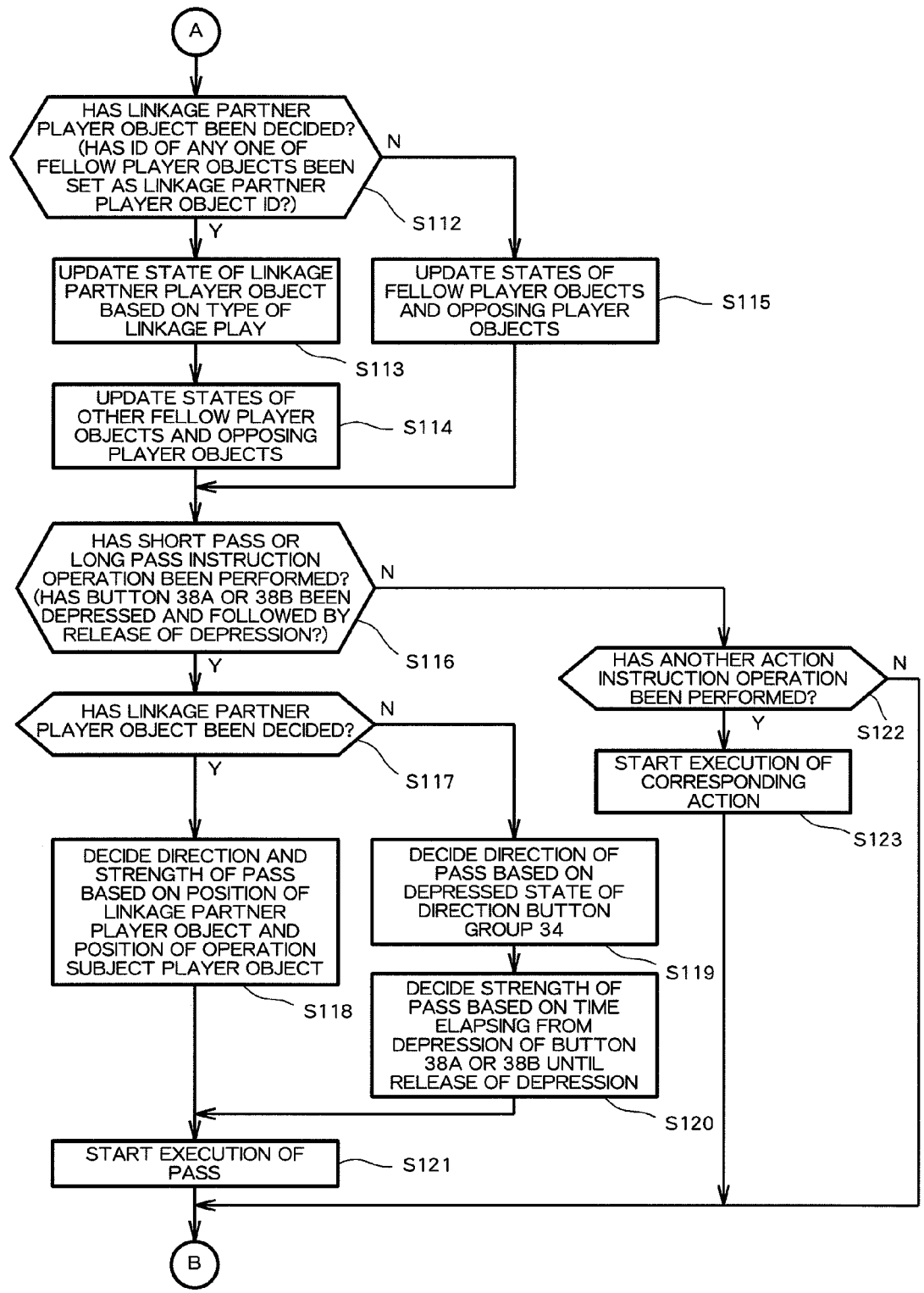
FIG. 12 is another flowchart showing the processing executed 15 on the game machine.
Figure 13:
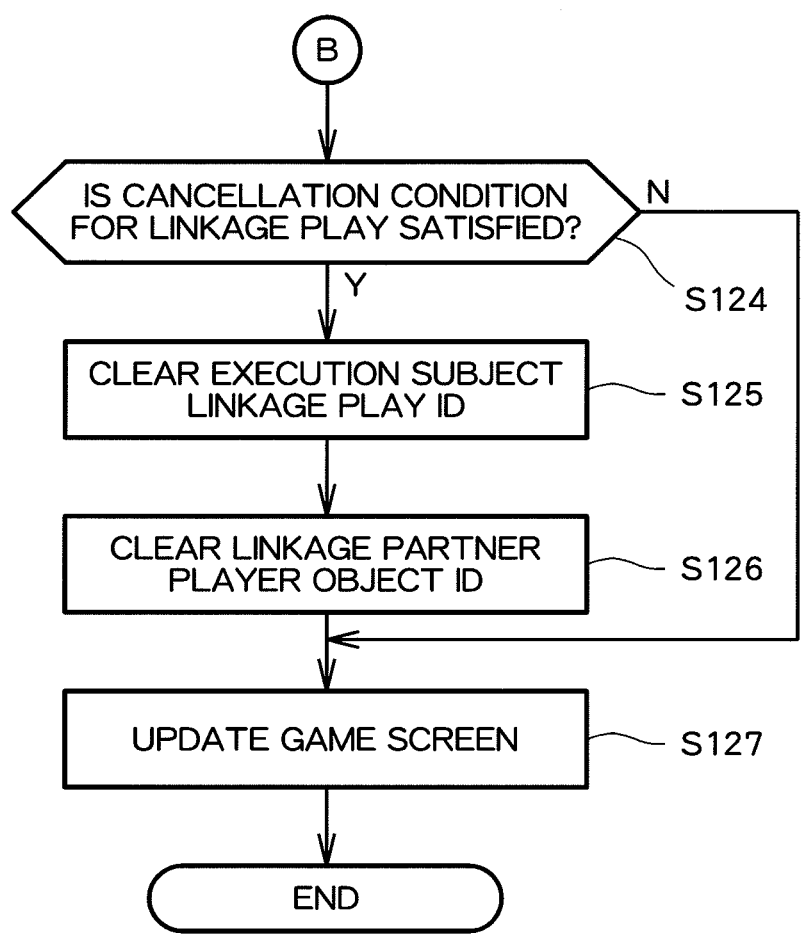
FIG. 13 is another flowchart showing the processing executed on the game machine.

Next, description will be given of processing executed on the game machine 10. FIGS. 11 to 13 are a flowchart showing a processing which is executed on the game machine 10 every predetermined time (for example, ¹⁄₆₀th of a second) and which is related to the present invention. The processing is implemented by the microprocessor 14 executing a program supplied via the DVD-ROM 25 or the communication network.

As shown in FIG. 11, in this processing, it is judged whether or not the button 42L has been depressed based on an operation signal inputted through the controller 32 (S101). If it is judged that the button 42L has been depressed, a linkage play selection guide flag is updated to "1" (S102). Herein, the linkage play selection guide flag represents information indicating whether or not the linkage play selection guide image 62 is displayed on the game screen. The linkage play selection guide flag takes the value "0" or and its initial value is "0". If the linkage play selection guide flag is "1", the linkage play selection guide image 62 is displayed on the game screen, while if the linkage play selection guide flag is "0", the linkage play selection guide image 62 is not displayed on the game screen.

After the processing of Step S102 has been executed, or if it is judged in Step S101 that the button 42L has not been depressed, it is judged whether or not the linkage play selection guide image 62 is in a state in which the linkage play selection guide image 62 is displayed on the game screen (S103). In other words, it is judged whether or not the linkage play selection guide flag is "1". If the linkage play selection guide image 62 is in the state in which the linkage play selection guide image 62 is displayed on the game screen, it is judged whether or not the button 40L has been depressed (S104). If it is judged that the button 40L has been depressed, an ID of the next linkage play according to a predetermined order is set as a highlighted linkage play ID (S105). Herein, the highlighted linkage play ID represents the ID of the linkage play to be highlighted in the linkage play selection guide image 62.

In addition, if the linkage play selection guide image 62 is in the state in which the linkage play selection guide image 62 is displayed on the game screen, it is judged whether or not the button 40R has been depressed (S106). If it is judged that the button 40R has been depressed, the highlighted linkage play ID at his point in time is set as an execution subject linkage play ID S107). Herein, the execution subject linkage play ID represents he ID of the linkage play selected as the execution subject by the user. In addition, if it is judged that the button 40R has been depressed, the linkage partner player object is decided from among the fellow player objects 56b (S108), and an ID of the decided fellow player object 56b is set as a linkage partner player object ID (S109) After that, the linkage play selection guide flag is updated into "0" (S110), and the highlighted linkage play ID is cleared (S111). In other words, the highlighted linkage play ID becomes an empty state.

After the processing of Steps S104 to S111 has been executed, or if it is judged in Step S103 that the linkage play selection guide image 62 is not in the state in which the linkage play selection guide image 62 is displayed on the game screen, the processing for updating the states (such as the position and the posture) of the player objects 56 and the ball object 58 is executed (S112 to S123).

First, the processing for updating the states of the player objects 56 other than the operation subject player object 56a (fellow player objects 56b and opposing player objects 56c) is executed (S112 to S115). More specifically, it is judged whether or not the linkage partner player object has been decided (S112). To be specific, it is judged whether or not the ID of any one of the fellow player objects 56b has been set as the linkage partner player object ID.

If the linkage partner player object has been decided, the state of the linkage partner player object (fellow player object 56b identified by the linkage partner player object ID) is updated based on the type of linkage play selected by the user (S113). After that, the states of other fellow player objects 56b and the opposing player objects 56c are updated irrespective of the type of linkage play selected by the user (S114). On the other hand, if the linkage partner player object has not been decided, the states of the fellow player objects 56b and the opposing player objects 56c are updated (S115). In this case, the type of linkage play has not been selected by the user, so the update is performed irrespective of the type of linkage play. Also in this case, the state of the ball object 58 is updated as necessary.

After the processing for updating the states of the player objects 56 other than the operation subject player object 56a has been executed, the processing for updating the state of the operation subject player object 56a is executed (S116 to S123). More specifically, it is judged whether or not the short pass or long pass instruction operation has been performed (S116). To be specific, it is judged whether or not the buttons 38A or 38B have been depressed and followed by the release of the depression.

If it is judged that the short pass or long pass instruction operation has been performed, it is judged whether or not the linkage partner player object has been decided (S117). This judgment is performed similarly to the case of the processing of Step S112.

If it is judged that the linkage partner player object has been decided, the direction and strength of the pass are decided based on the position of the linkage partner player object and the position of the operation subject player object 56a (S118). To be more specific, a direction based on the direction from the position of the operation subject player object 56a toward the position of the linkage partner player object is decided as the direction of the pass, and the strength of the pass is decided based on the distance between the position of the operation subject player object 56a and the position of the linkage partner player object.

On the other hand, if the linkage partner player object has not been decided, a direction corresponding to the depressed state of the direction button group 34 is decided as the direction of the pass (S119). Further, the strength of the pass is decided based on the time elapsing from the depression of the button 38A or 38B until the release of the depression (S120).

In Step S118 or Steps S119 and S120, if the direction and strength of the pass are decided, the execution of the short pass or long pass is started (S121). For example, with regard to the operation subject player object 56a, reproduction of the motion data of the short pass or long pass action is started. Further, for example, the movement of the ball object 58 is started based on the direction and strength of the pass decided in Step S118 or Steps S119 and S120.

Note that it is judged in Step S116 that the short or long pass instruction operation has not been performed, it is judged whether or not another action instruction operation has been performed (S122). If it is judged that another action instruction operation has been performed, the execution of the corresponding action is started (S123). For example, if the shot instruction operation has been performed, with regard to the operation subject player object 56a, the reproduction of the motion data of the shot action is started, and at the same time, the movement of the ball object 58 is started.

After the processing for updating the state of the player object 56 or the ball object 58 has been executed, it is judged whether or not a cancellation condition for the linkage play is satisfied (S124). For example, it is judged whether or not the ball object 58 has been intercepted by the opposing player object 56c. If the cancellation condition for the linkage play is satisfied, the execution subject linkage play ID is cleared (S125), and the linkage partner player object ID is also cleared (S126). In other words, the execution subject linkage play ID and the linkage partner player object ID become an empty state, a state in which no execution subject linkage play or no linkage partner player object is selected.

After the processing of Steps S101 to S126 has been executed, the game screen is updated (S127). To be specific, first, the image showing the picture obtained by viewing the virtual three-dimensional space 50 from a given viewpoint is formed in the VRAM based on the storage content of the game situation information storage unit 78. After that, if the linkage play selection guide flag is "1", the linkage play selection guide image 62 is drawn over a predetermined position of the image formed in the VRAM. At this time, in the linkage play selection guide image 62, for example, a hatched image is further drawn over the linkage play identified by the highlighted linkage play ID, and the linkage play is highlighted. If the ID of any one of the linkage plays is set as the execution subject linkage play ID, the execution subject linkage play guide image 64 for guiding the corresponding linkage play is drawn over the predetermined position of the image formed in the VRAM. The game screen thus formed in the VRAM is display-outputted on the monitor 18 at a predetermined time.

As described above, in the game machine 10 according to this embodiment, the user selects a desired linkage play to thereby allow the partner for the linkage play (linkage partner player object) to be selected from among the fellow player objects 56b based on the type of linkage play. In addition, the state of the linkage partner player object is controlled based on the type of linkage play selected by the user. Further, the processing corresponding to the pass instruction operation differs between the state in which the linkage partner player object has not been selected and the state in which the linkage partner player object has been selected. In the state in which the linkage partner player object has been selected, the pass to the linkage partner player object is executed without being affected by the operation state of the direction button group 34. Therefore, according to the game machine 10, the user can perform the linkage attack using a pass, which is realized by involving a plurality of player objects 56, by a relatively simple operation. Consequently, the operability of the soccer game can be improved, with the result that the amusement of the soccer game can be enhanced.

Further, in the game machine 10, the user selects a desired linkage play to thereby effect the linkage play aiding function. Therefore, for example, a highly experienced user or the like can enjoy playing the conventional soccer game without using the linkage play aiding function.

Note that the present invention is not limited to the embodiment described above. For example, the present invention can be applied to not only the soccer game but also various ball games such as a basketball sport game. Further, the present invention is not limited to the ball sport game, and can also be applied to a sports game played by using a moving body. For example, the present invention can be applied to an ice hockey game played by using a puck (moving body).

Further, for example, the virtual game space built in the main memory 26 of the game machine 10 is not limited to the virtual three-dimensional space defined by 3 coordinate elements, and may also be a two-dimensional virtual space defined by 2 coordinate elements.

Figure 14:
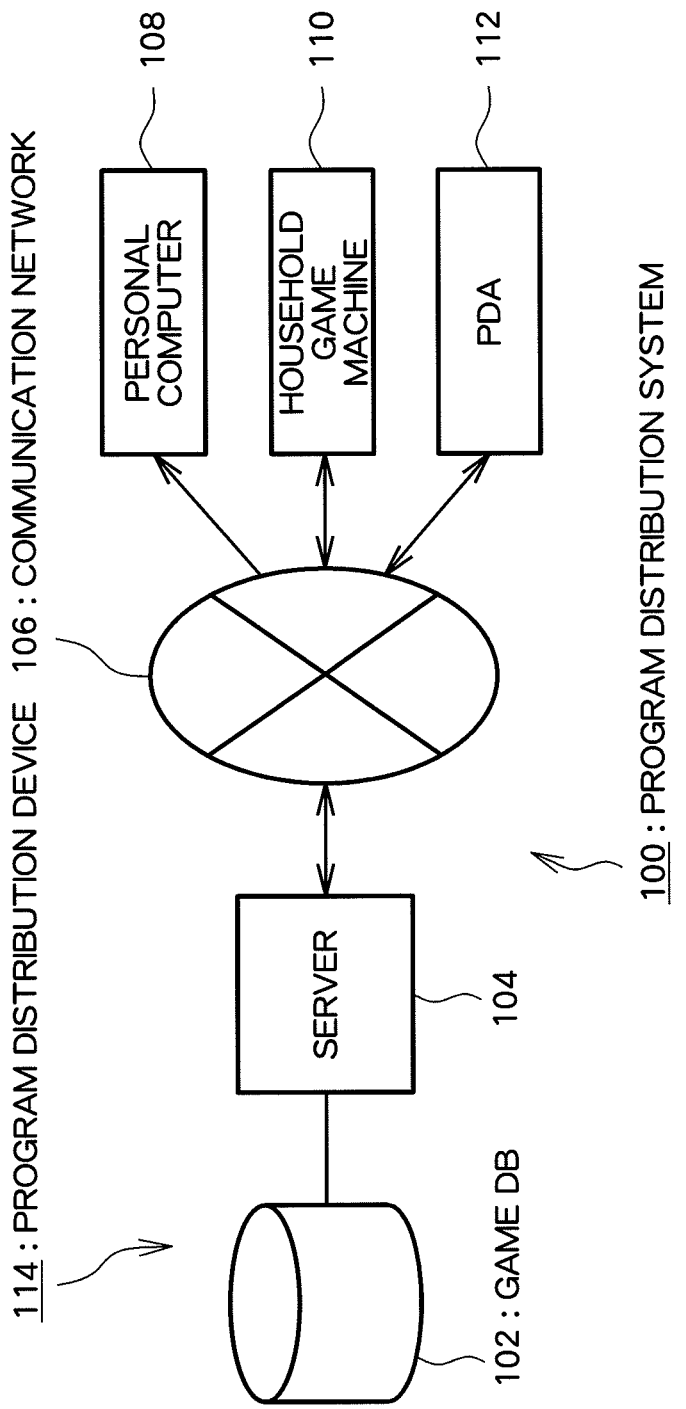
FIG. 14 is a diagram showing an entire configuration of a program distribution system according to another embodiment of the 20 present invention.

Still further, in the description given above, the programs are supplied to the household game machine 11 from the DVD-ROM 25 serving as an information storage medium, and may also be distributed to homes and the like via the communication network. FIG. 14 is a diagram illustrating a whole structure of a program distribution system using the communication network. A program distribution method according to the present invention will be described with reference to FIG. 14. As illustrated in the figure, a program distribution system 100 includes a game database 102, a server 104, a communication network 106, a personal computer 108, a household game machine 110, and a personal digital assistant (PDA) 112. Among those structural elements, the game database 102 and server 104 together constitute a program distribution device 114 cable TV network. In this system, the game database (information storage medium) 102 stores programs having the same storage contents as those of the DVD-ROM 25. Then, a prospective consumer makes a game distribution request by use of the personal computer 108, the household game machine 110, the PDA 112, or the like, whereby the request is transferred to the server 104 via the communication network 106. Then, the server 104 reads the programs from the game database 102 in response to the game distribution request, and transmits the programs to the game distribution requester such as the personal computer 108, the household game machine 110, the PDA 112, etc. Herein, the game is distributed in response to the game distribution request. However, the server 104 may transmit the game one-sidedly. Further, all of the required programs may not necessarily be distributed at onetime (batch distribution) in order to actualize the game, and necessary program modules may also be distributed (segmented distribution) corresponding to a stage of the game. Thus, the game is distributed via the communication network 106, whereby the prospective consumer can easily obtain the programs.

What is claimed is:

1. A game machine, which displays a game screen showing a situation of a game space in which an operation subject player character that acts according to a user's operation, fellow player characters belonging to the same team as the operation subject player character, and a moving body character that represents a moving body, are located, and which executes a game of a sport played by using the moving body between the team to which the operation subject player character belongs and an opposing team, comprising:

linkage partner selecting unit for selecting a linkage partner player character from among the fellow player characters;

type of linkage play selecting unit for selecting a type of linkage play automatically without input from the user;

linkage partner control unit for controlling, after the type of the linkage play and the linkage partner player character are selected, a position of the linkage partner player character selected by the linkage partner selecting unit based on the type of linkage play selected by the type of linkage play selecting unit, at least until a pass instruction operation is performed; and pass execution unit for, in the case where the pass instruction operation is performed by the user, causing the operation subject player character to execute a pass in a direction within the game space based on a content of the pass instruction operation if the linkage partner player character has not been selected by the linkage partner selecting unit, and causing the operation subject player character to execute a pass to the linkage partner player character if the linkage partner player character has been selected by the linkage partner selecting unit, wherein a strength and a direction of the pass to the linkage partner player character is automatically determined based on a position of the linkage partner player character and a position of the operation subject player object.

2. A control method of a game machine which displays a game screen showing a situation of a game space in which an operation subject player character that acts according to a user's operation, fellow player characters belonging to the same team as the operation subject player character, and a moving body character that represents a moving body, are located, and which executes a game of a sport played by using the moving body between the team to which the operation subject player character belongs and an opposing team, comprising:

a linkage partner selecting step of selecting a linkage partner player character from among the fellow player characters;

a type of linkage play selecting step of selecting a type of linkage play automatically without input from the user;

a linkage partner control step of controlling, after the type of the linkage play and the linkage partner player character are selected, a position of the linkage partner player character selected by the linkage partner selecting step based on the type of linkage play selected by the type of linkage play selecting step, at least until a pass instruction operation is performed; and a pass execution step of, in the case where the pass instruction operation is performed by the user, causing the operation subject player character to execute a pass in a direction within the game space based on a content of the pass instruction operation if the linkage partner player character has not been selected by the linkage partner selecting step, and causing the operation subject player character to execute a pass to the linkage partner player character if the linkage partner player character has been selected by the linkage partner selecting step, wherein a strength and a direction of the pass to the linkage partner player character is automatically determined based on a position of the linkage partner player character and a position of the operation subject player object.

3. A non-transitory computer-readable information storage medium recorded with a program for causing a computer to function as a game machine which displays a game screen showing a situation of a game space in which an operation subject player character that acts according to a user's operation, fellow player characters belonging to the same team as the operation subject player character, and a moving body character that represents a moving body, are located, and which executes a game of a sport played by using the moving body between the team to which the operation subject player character belongs and an opposing team, the program further causing the computer to function as:

linkage partner selecting unit for selecting a linkage partner player character from among the fellow player characters;

type of linkage play selecting unit for selecting a type of linkage play automatically without input from the user;

linkage partner control unit for controlling, after the type of the linkage play and the linkage partner player character are selected, a position of the linkage partner player character selected by the linkage partner selecting unit based on the type of linkage play selected by the type of linkage play selecting unit, at least until a pass instruction operation is performed; and pass execution unit for, in the case where the pass instruction operation is performed by the user, causing the operation subject player character to execute a pass in a direction within the game space based on a content of the pass instruction operation if the linkage partner player character has not been selected by the linkage partner selecting unit, and causing the operation subject player character to execute a pass to the linkage partner player character if the linkage partner player character has been selected by the linkage partner selecting unit, wherein a strength and a direction of the pass to the linkage partner player character is automatically determined based on a position of the linkage partner player character and a position of the operation subject player object.

4. The game machine of claim 1, wherein: the linkage partner selecting unit selects the linkage partner player character from among the fellow player characters based on the user's operation, and after the selection is made by the linkage partner selecting unit, the type of linkage play selecting unit selects the type of linkage play automatically based on the linkage partner player character selected by the linkage partner selecting unit.

5. The game machine of claim 4, wherein the type of linkage play selecting unit selects the type of linkage play automatically based on the distance between the linkage partner player character selected by the linkage partner selecting unit and the operation subject player character.

6. The game machine of claim 1, wherein the type of linkage play comprises one of a one-to-two pass, a cross, and an open space.

7. The game machine of claim 1, wherein the linkage partner player character selected by the linkage partner selecting unit, upon receiving the pass, executes a linkage player event comprising one of (a) passing to one of the fellow player characters and the operation subject player object, and (b) shooting the moving body character toward a goal object.

8. The control method of claim 2, wherein: the linkage partner selecting step selects the linkage partner player character from among the fellow player characters based on the user's operation, after the selection is made by the linkage partner selecting step, the type of linkage play selecting step selects the type of linkage play automatically based on the linkage partner player character selected by the linkage partner selecting step.

9. The control method of claim 8, wherein the type of linkage play selecting step selects the type of linkage play automatically based on the distance between the linkage partner player character selected by the linkage partner selecting step and the operation subject player character.

10. The control method of claim 2, wherein the type of linkage play comprises one of a one-to-two pass, a cross, and an open space.

11. The control method of claim 2, wherein the linkage partner player character selected by the linkage partner selecting step, upon receiving the pass, executes a linkage player event comprising one of (a) passing to one of the fellow player characters and the operation subject player object, and (b) shooting the moving body character toward a goal object.

12. The non-transitory computer-readable information storage medium of claim 3, wherein: the linkage partner selecting unit selects the linkage partner player character from among the fellow player characters based on the user's operation, and after the selection is made by the linkage partner selecting unit, the type of linkage play selecting unit selects the type of linkage play automatically based on the linkage partner player character selected by the linkage partner selecting unit.

13. The non-transitory computer-readable information storage medium of claim 12, wherein the type of linkage play selecting unit selects the type of linkage play automatically based on the distance between the linkage partner player character selected by the linkage partner selecting unit and the operation subject player character.

14. The non-transitory computer-readable information storage medium of claim 3, wherein the type of linkage play comprises one of a one-to-two pass, a cross, and an open space.

15. The non-transitory computer-readable information storage medium of claim 3, wherein the linkage partner player character selected by the linkage partner selecting unit, upon receiving the pass, executes a linkage player event comprising one of (a) passing to one of the fellow player characters and the operation subject player object, and (b) shooting the moving body character toward a goal object.

* * * * *